United States Patent [19]

Magneville

[11] Patent Number: 4,694,435
[45] Date of Patent: Sep. 15, 1987

[54] VERTICAL MARINE STREAMER

[75] Inventor: Pierre Magneville, Vernouillet, France

[73] Assignee: Institut Francais Du Petrole, Rueil-Malmaison, France

[21] Appl. No.: 814,766

[22] Filed: Dec. 30, 1985

[30] Foreign Application Priority Data

Dec. 28, 1984 [FR] France .................. 84 20060

[51] Int. Cl.⁴ .............................................. G01V 1/38
[52] U.S. Cl. ...................................... 367/17; 367/20; 367/154; 441/21
[58] Field of Search ............. 367/3, 4, 6, 106, 130, 367/141, 154, 159, 112, 15, 16, 17, 19, 20; 441/21, 28, 25

[56] References Cited

U.S. PATENT DOCUMENTS

| | | | |
|---|---|---|---|
| 2,735,303 | 9/1956 | Haase | 367/16 |
| 3,810,081 | 5/1974 | Rininger | 367/106 |
| 4,298,964 | 11/1981 | Warnshuis et al. | 367/4 |

Primary Examiner—Charles T. Jordan
Assistant Examiner—John W. Eldred
Attorney, Agent, or Firm—Antonelli, Terry & Wands

[57] ABSTRACT

A device for receiving acoustic waves in water and adapted to be positioned vertically in the water in a stable position. The device comprises a tubular element formed of several connected sections, buoyancy means close to a first end, ballasting means close to the second end, several receivers spaced apart inside certain sections of the tubular element and stabilizer fins fixed to the second end thereof. A cable connects the tubular elements to a towing vehicle.

2 Claims, 4 Drawing Figures

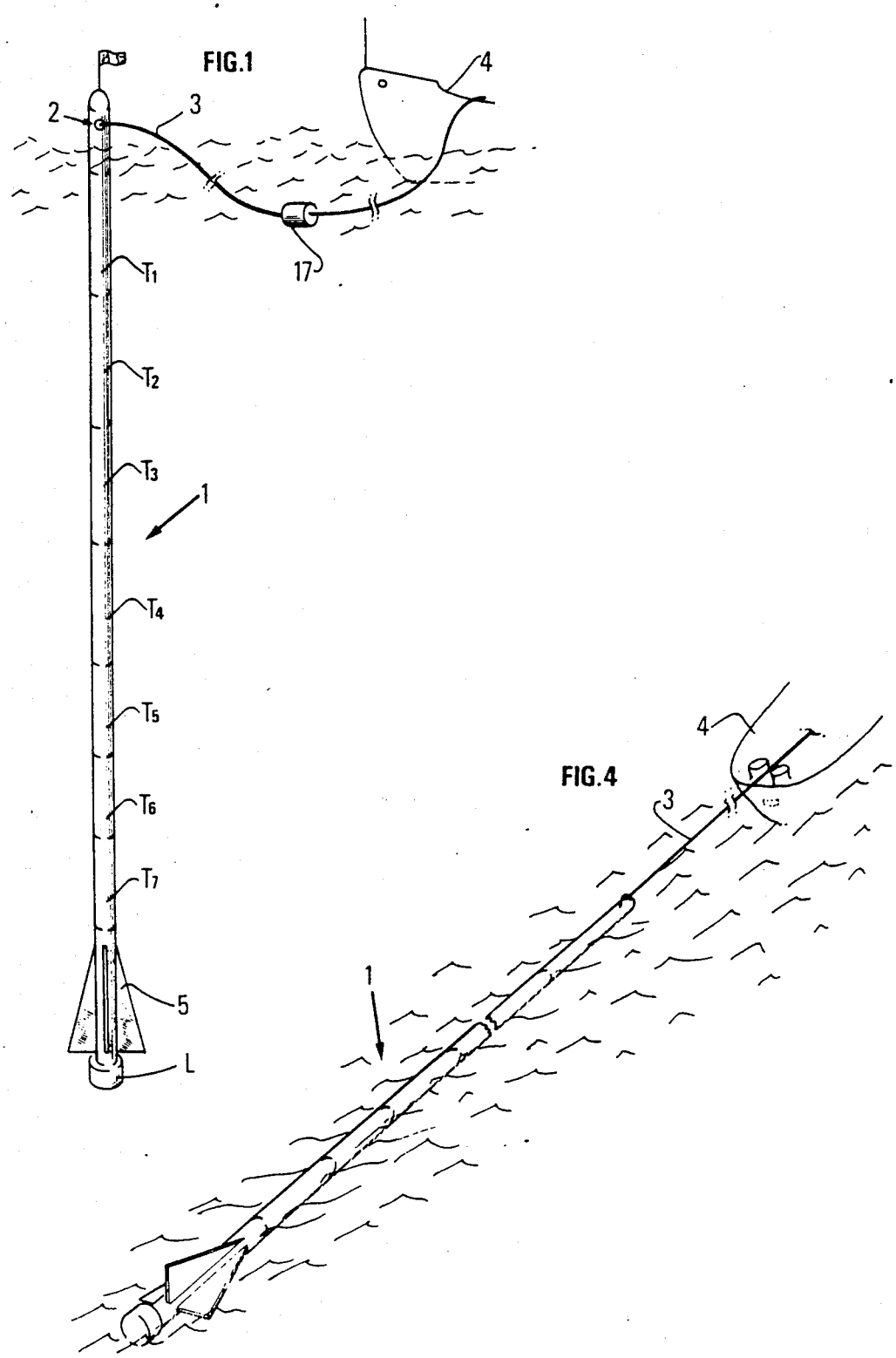

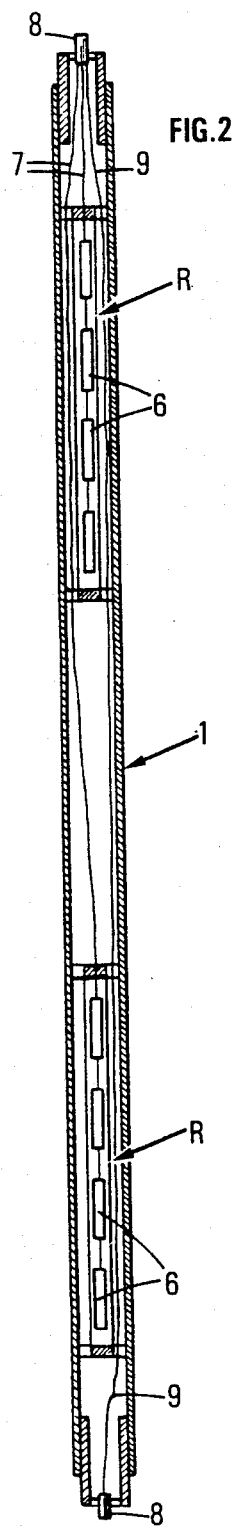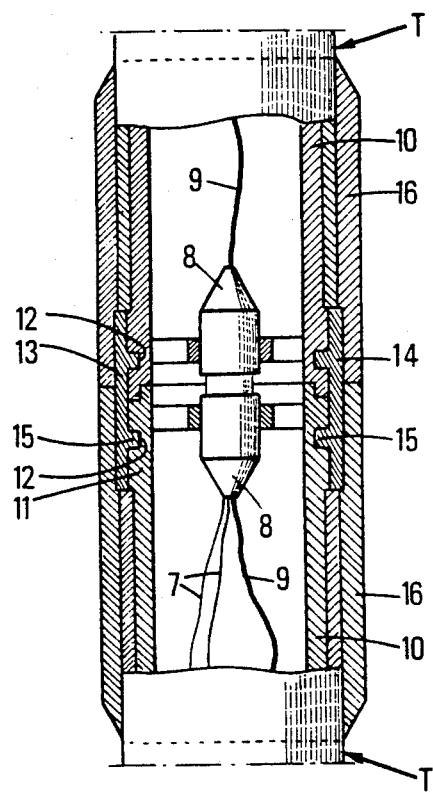

VERTICAL MARINE STREAMER

BACKGROUND OF THE INVENTION

The present invention relates to a device for receiving acoustic waves in water and more particularly a reception device comprising a plurality of receivers disposed operationally at different depths.

The device of the invention finds applications in the fields of oceanography, acoustic detection or else seismic prospection at sea, for example.

In the field of oceanography it is known to use radio buoys comprising a floating body associated with radio transmitting equipment connected to one or more immersed sensors such as hydrophones. The sensors are supported either by a weighted cable, or by a tube, or a column, which is adapted to remain in a substantially vertical position and is very often anchored to the sea bed. Such buoys are described in, for example, U.S. Pat. Nos. 3,405,558, 3,488,783 or 3,541,498.

Certain seismic prospection operations, by refraction, for example, comprise the use of a radio buoy from which is suspended a sensor such as a hydrophone, adapted for detecting the acoustic waves refracted by the different layers of the subsoil, in response to seismic pulses emitted by a marine source towed behind a ship. The buoy is placed in the water and the ship moves off from it. The seismic source which it tows is actuated periodically. The waves picked up are transmitted by radio to a recording laboratory installed on the ship.

A buoy of this type is described in, for example, U.S. Pat. No. 3,671,928.

The use of one or more free radio buoys left behind a seismic ship has numerous drawbacks.

Because of the currents, it is sometimes difficult to determine their exact positions at the successive moments when the seismic source is actuated. It is also often difficult to locate them, once the seismic prospection operations are finished and when that is possible recovery thereof requires manoeuvers which are sometimes long.

In numerous cases, it is preferred to use radio buoys with a single transmission channel and having inexpensive fairly scratch electronic equipment which may therefore be abandoned at the end of the seismic surveying if circumstances do not lend themselves to their recovery.

Furthermore, radio buoys which are not anchored are subject to the movements of the swell and the sensor elements suspended below are subject to vertical movements which generate background noise. The damping means which are often found associated with the cable supporting the sensor element has only a limited power and contributes to making the radio buoys more complex and more difficult to place in the water.

Another disadvantage of radio buoys related to the preceding one concerns their size especially when they comprise a plurality of spaced sensors, fixed to a relatively long immersed part. It is difficult to move such a buoy from one position to another because it is often necessary to hoist it entirely out of the water.

The device of the invention avoids the above mentioned drawbacks.

SUMMARY OF THE INVENTION

The device of the invention comprises a tubular element or streamer whose length is great with respect to its section and ballasting elements for weighting the tubular element disposed near a first end thereof. It is characterized in that it comprises a plurality of acoustic wave receivers spaced apart inside the tubular element, which contains buoyancy elements near its second end, the distribution of the masses being such that the tubular element floats vertically in the water in a static and stable position. The device further comprises profiled stabilizer fins fixed in the vicinity of the first end of the tubular element, the arrangement and area thereof being chosen so as to ensure the dynamic trim of the tubular element in a substantially horizontal position, when it is towed by a ship.

In one embodiment, the device also comprises a cable for connection with a surface vehicle, the cable comprising electric conductors connecting the different receivers to recording means disposed on the vehicle.

In a particular embodiment, the device further comprises an element for measuring the immersion depth which is fixed to the connecting cable, with the measuring element being connected by electric conductors of the cable to a piloting system adapted for maintaining a certain preferably constant spacing between the vehicle and the tubular element when this latter is disposed vertically in a stable balanced position in the water.

The arrangement of the different receivers and conducting wires associated with the inside facilitate the construction of a smooth elongate element which, more especially because of its length, is very insensitive to the oscillations of the swell. Consequently, the background noise of hydrodynamic origin which is superimposed on the signals received by the receiver is very small.

Furthermore, the distribution of the masses and the presence of the lift fins allow the device to be towed without difficulty from one measuring position to another and to be rapidly positioned vertically, which is very useful for numerous applications, more especially for seismic prospection operations.

BRIEF DESCRIPTION OF THE DRAWINGS

A particular embodiment of the invention will be described in greater detail hereafter by way of non limitative example and with reference to the accompanying drawings in which:

FIG. 1 shows schematically the tubular element in a stable position disposed vertically in the water, FIG. 2 shows schematically a section of the tubular element in which are disposed hydrophone assemblies, FIG. 3 shows schematically the means for connecting any two sections of the tubular element together, and FIG. 4 shows the tubular element in the horizontal position in the water when it is towed by a surface vehicle.

DETAILED DESCRIPTION

Referring now to the drawings where like reference numerals are used throughout the various views to designate like parts and more particularly, to FIG. 1 according to this figure, device of the invention comprises a tubular element or streamer 1 made from a plastic material transparent to acoustic waves. The tubular element or streamer 1 is provided in the vicinity of a first end with means 2 for securing to a cable 3, which is connected to a towing boat 4. A ballast L is fixed at its opposite end. In the vicinity of this end are also fixed profiled stabilizer fins 5.

The tubular element 1 comprises, for example, six interconnected sections $T_1, T_2, \ldots T_6$. The three sections $T_1$, $T_2$, $T_3$, the closest to the first end contain floats (not shown). The three opposite sections $T_4$, $T_5$, $T_6$ contain acoustic receivers R. Each of them comprises (FIG. 2) a tube inside which are disposed a plurality of hydrophones 6 interconnected electrically by conductors 7. In a particular embodiment, each active section of the tubular element 1 may comprise two receivers R each formed by the interconnection of six to twelve hydrophones.

An electric connector 8 is fixed to the opposite ends of each section. A multiconductor cable 9 is disposed inside each of them. Its different conductors interconnect a part at least of the pins of the two end connectors 8. In each of its active sections $T_4$ to $T_6$, the electric conductor 7 associated with the different receivers R are connected at one of the ends to a connector 8. Their connection to the different conductors or lines of the multiconductor cable 9 is provided in said connector.

The density of the active sections is greater than that of the water.

A tubular end piece 10 is force fitted inside the end parts of each section T of the tubular element 1 (FIG. 3). Each end piece comprises a head 11 of a diameter greater than that of each section and having a circular groove 12.

The end pieces of two consecutive sections T of the tubular element 1 are interconnected by two half shells 13, 14 having two splines 15 on their inner face. The two half shells 13, 14 are brought close together so as to grip around the heads of the two end pieces, the splines 15 being engaged in grooves 12. They are held in position by two sleeves 16 which may slide on the outside of the two sections T and which are brought close together during assembly until they completely cover the engaged pieces.

The form and section of the sleeves 16 are chosen so as to minimize the hydrodynamic noises.

The electric connectors 8 are disposed inside end pieces 10. When two consecutive sections are connected, the pins of the end electric connectors are interconnected before fitting the shells 13, 14 and engaging sleeves 16 thereon.

The multiconductor cable 9 extends over the whole length of the tubular element and, at the first end thereof, is connected to electric conductors contained in the towing cable 3. The signals collected by the different receivers R may be transmitted by this means to a storage or recording system installed on the boat, not shown, and be transmitted directly, if required, to a recording station.

The distribution of the masses between the different sections $T_1$ to $T_6$ and the presence of ballast L (FIG. 1) mean that, when the towing boat stops, the tubular element erects itself and assumes a vertical position and is almost entirely submerged. The shape end dimensions of the fins 4 are calculated so that the towing forces create a considerable hydrodynamic force which raises the rear part of the device and stabilizes it against rotation when the towing boat advances (FIG. 4). The profiled shape given to the tubular body means that it has very low hydrodynamic drag.

The tubular element 1 is chosen to be sufficiently long so that its movements under the effect of the swell are negligible when it is in a stationary vertical position. Its length may vary from several tens of meters to several hundred meters depending on the number of sections forming it.

Setting up of the device in the operation position is very much simplified. The towing boat tows the tubular element (FIG. 4) to a position chosen for use thereof and stops. When the towing cable 3 is sufficiently slack, the tubular element straightens up until it assumes the vertical position (FIG. 1) and is stabilized.

Measurements may then be made at different depths by receivers R. It may, for example, be the detection of signals refracted during seismic prospection operations.

Since an inopportune pull exerted on the cable might cause the tubular element to slant or to assume a horizontal position, whereas it is in a vertical position and acoustic measurements are being made, if the boat is moved by the wind, the currents or else the swell, the device advantageously comprises means for stabilizing variations in the distance separating them. These means comprise a ballasted depth sensor 17 (FIG. 1) fixed to cable 3 half way therealong, which measures the immersion depth of this latter in its lowest part. Sensor 17 is connected to a line of cable 3 and the signal which it generates is transmitted to a piloting system (not shown) on board the ship. Depending on this signal, the piloting system acts on the propelling means and possibly on the helm so that the immersion depth of the sensor 17 is kept close to a given value.

The towing vehicle may be of low tonnage. It may advantageously be a remote controlled motor boat, similar to the one described in, for example, French patent application EN No. 84/18 590 and whose movements are controlled from a main ship having a radio remote detection and remote control system.

For some applications, the ship moves with a uniform movement, towing a seismic source which is actuated periodically. The motor boat receives by radio the order to move the reception device from one position to another of a succession of given positions and to stop there for a period of time sufficient for picking up the echoes from the subterranean layers of the seismic pulses emitted by the source.

The propulsion means of the motor boat are, for example, of the hydrojet type.

In this case the system for piloting the motor boat acts as a function of the signal delivered by the depth sensor 17 (FIG. 1) for controlling the speed of rotation of the turbine and the orientation of the water ejection jets with respect to the vehicle.

If the boat is a motor boat of the type described in the above-mentioned French patent application, the signals picked up by the different receivers R of the device are transmitted by the connecting cable 3 to a radio transmission system and are sent to a recording laboratory installed on the main ship.

What is claimed is:

1. A device for receiving acoustic waves in water at a plurality of different depth levels, the device comprising a hollow tubular member having a great length with respect to an amplitude of a swell and a smooth outer surface transparent to acoustic waves, said tubular member including near one end thereof a closed compartment containing buoyancy means and a plurality of sensor means disposed along and in fixed relationship with respect to said tubular member for receiving acoustic waves through said outer surface, cable means for connecting said tubular member to a vehicle, said cable means comprising transmission lines for connecting said sensor means to recording means on the vehicle, a weight means and profiled stabilizer fins fixed close to an opposite end of said tubular member, a distribution of masses of the hollow tubular member, the buoyancy elements and an arrangement and area of said stabilizer fins is such that the tubular member floats vertically in water in a static stable position and lies in a substantially horizontal position when towed by a vehicle under an effect of hydrodynamic forces on said stabilizer fins, and wherein means are provided for measuring an immersion depth of the cable and connected therethrough to a piloting means whereby said vehicle is prevented from applying any towing force when said tubular member is vertically oriented in water.

2. The device as claimed in claim 1, wherein said hollow tubular member includes a plurality of individual sections, each of said individual sections comprising end pieces having heads fixed to respective ends thereof, and means are provided for interconnecting the adjacent sections to each other including shell means and sleeve means cooperating with the heads of adjacent end pieces for holding said end pieces in position with respect to each other, and electrical connector means are provided for interconnecting electrical conductor means disposed in each of said individual sections.

* * * * *